United States Patent [19]

Rogers et al.

[11] Patent Number: 4,952,464
[45] Date of Patent: Aug. 28, 1990

[54] SODIUM SULFUR CELL FOR WEIGHTLESS ENVIRONMENTS

[75] Inventors: Howard H. Rogers, Torrance; Richard P. Sernka, Long Beach; Steven J. Stadnick, Redondo Beach, all of Calif.

[73] Assignee: Hughes Aircraft Company, Los Angeles, Calif.

[21] Appl. No.: 299,368

[22] Filed: Jan. 19, 1989

[51] Int. Cl.$^5$ .................... H01M 10/34; H01M 4/36
[52] U.S. Cl. ...................................... 424/57; 429/104
[58] Field of Search .................... 429/57, 104

[56] References Cited

U.S. PATENT DOCUMENTS 4,006,281  2/1977  Markin et al. ............... 429/104 X
4,167,807  9/1979  Verity ........................... 429/104 X

*Primary Examiner*—Stephen J. Kalafut

*Attorney, Agent, or Firm*—Steven M. Mitchell; Robert A. Westerlund; W. K. Denson-Low

[57] ABSTRACT

A sodium sulfur electrical storage cell includes means for avoiding bubbles in the sulfur cathode during operation in a weightless environment. Formation of bubbles of sulfur or other gas in the cathode is prevented by pressurizing the sulfur cathode to a pressure greater than the vapor pressure of the sulfur at the operating temperature, typically about 350 C. The applied pressure is preferably supplied by a chemical compound, such as sodium azide, that is placed into the chamber holding the sulfur. At the operating temperature of the cell, the compound decomposes to produce a gas, nitrogen in the case of the sodium azide, that is substantially insoluble in the sulfur yet produces a sufficiently high pressure over the liquid sulfur that bubbles of gaseous sulfur or other gases cannot form in the sulfur. If bubbles were permitted to form in a weightless environment, they would migrate to a location where they would interfere with the operation of the cell.

15 Claims, 1 Drawing Sheet

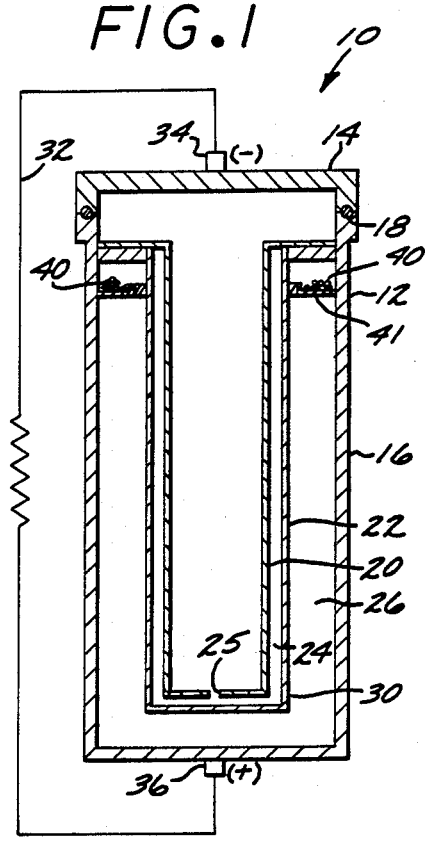
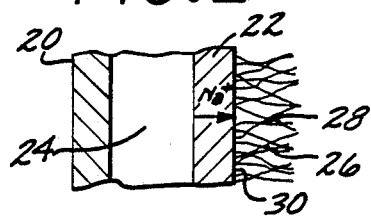
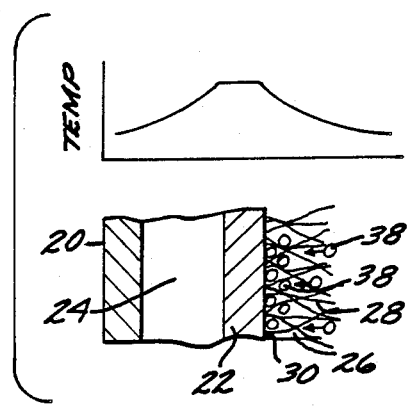
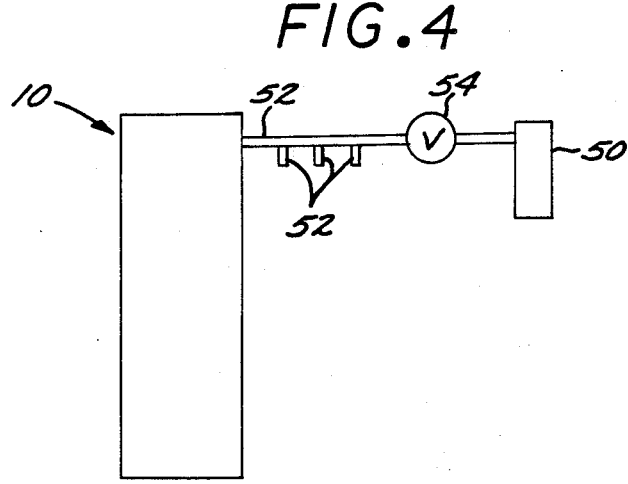

SODIUM SULFUR CELL FOR WEIGHTLESS ENVIRONMENTS

This invention was made with Government support under Contract No. F33615-86-C-2619, for Eagle-Picher Ind., Inc. P.O. #FC10785, awarded by the Air Force. The Government has certain rights in this invention.

BACKGROUND OF THE INVENTION

This invention relates to electrical storage cells, and, more particularly, to a sodium sulfur cell for use in a weightless environment.

Rechargeable cells or batteries are electrochemical devices for storing and retaining an electrical charge and later delivering that charge for useful power. Familiar examples of the rechargeable cell are the lead-acid cell used in automobiles and the nickel-cadmium cell used in portable electronic devices such as cameras. Another type of cell having a greater storage capacity for its weight is the nickel oxide pressurized hydrogen cell, an important type of which is commonly called the nickel-hydrogen cell and is used in spacecraft applications.

Yet another type of cell is the sodium sulfur cell, which has been under development for about 20 years for use in a variety of terrestrial applications such as nonpolluting electric vehicles. The sodium sulfur cell has the particular advantage that its storage capacity per unit weight of cell is nearly three times, and in some designs as much as five times, the storage capacity of the nickel-hydrogen cell. The sodium sulfur cell therefore is an attractive candidate for use in spacecraft applications.

The most common type of construction for a sodium sulfur cell includes a cylindrical metal outer housing which serves as a positive terminal and a cylindrical shell of an alumina based ceramic within the outer housing. Sodium is placed into a first or inner chamber formed within the alumina shell, and sulfur is placed into a second chamber formed between the alumina shell and the outer housing. The cell is heated to a temperature of about 350° C., at which temperature both the sodium and the sulfur are molten. The liquid sodium acts as the anode of the cell, the liquid sulfur acts as the cathode, and the solid ceramic acts as the electrolyte. Electrical energy is released when sodium ions diffuse through the ceramic into the sulfur, thereby forming sodium polysulfides. Electrical energy can be stored when the process is reversed, with an applied voltage causing the sodium polysulfides to decompose to yield sodium and sulfur, and the sodium ions diffuse through the ceramic electrolyte back into the first chamber.

The sodium sulfur cell is under consideration for many applications requiring a high capacity of electrical energy storage, such as electrically powered automobiles. It has not as yet found widespread use because of the state of development of such electrically powered vehicles, and because of engineering problems associated with the operation of the cell at elevated temperatures, in the automotive environment.

The sodium sulfur cell is also a candidate for use in energy storage for spacecraft such as communications satellites. A satellite orbiting the earth is exposed to intense sunlight and then plunged into shadow in a periodic manner. In most satellites, electrical energy to power the systems on board the satellite is created by solar cells that function when the satellite is in sunlight, and a portion of the electrical energy so generated is stored in electrical storage cells. The stored energy is then available for use when the satellite is in the earth's shadow or for peak power demands, by discharging the cells.

Nickel-cadmium and nickel-hydrogen electrical storage cells are currently used in many satellite applications. Such cells have the capacity to store at most about 17–18 watt hours per pound of battery weight. A sodium sulfur cell has the capacity to store over 50 watt hours per pound of battery weight using existing cell designs. In one example, about 670 pounds of nickel-hydrogen cells are required in a communications satellite to meet its storage needs. If the nickel-hydrogen cells were replaced by sodium sulfur cells, the weight of storage cells would be reduced to less than 250 pounds. The weight of the cells is included in the cost of launching the satellite, which presently is on the order of $20,000 per pound, and a potential reduction of over 400 pounds is highly significant.

Although sodium sulfur cells offer potential benefits in spacecraft applications, their operation has been established only on earth. A key difference between operation in a terrestrial environment and in a spacecraft is the absence of gravity in space. It has been determined that the absence of gravity may have significant adverse effects on the functioning of the cell, particularly under fast discharge conditions, that are not experienced in earthbound applications. There is a need to develop an approach to avoiding the expected adverse effects prior to building and launching such cells. The present invention fulfills this need, and further provides related advantages.

SUMMARY OF THE INVENTION

The present invention provides a sodium sulfur cell, and process for storing and obtaining previously stored energy, that avoid one of the problems associated with use of such cells in a weightless environment. The approach of the invention does not significantly alter the basic structure and operation of the cell, but does avoid a high cell impedance and associated limitations on rate of discharge when the cell is operated in the absence of gravity. The preferred approach adds little to the cost and weight of the cell.

In accordance with the invention, a sodium sulfur electrical storage cell comprises a sodium anode; a sulfur cathode; a solid ceramic electrolyte separating the sodium anode and the sulfur cathode; and means for avoiding bubbles in the sulfur. Preferably, the means for avoiding includes means for pressurizing the sulfur cathode to prevent the formation of bubbles in the sulfur.

At the operating temperature of about 350° C., the sodium anode and the sulfur cathode in a sodium sulfur cell are molten. It is possible that bubbles may form within these phases, and in particular the formation of bubbles in the sulfur phase can result in a progressive increase in the internal impedance of the cell and its eventual failure in the sense of being unable to store further electrical charge, for the reasons to be discussed next.

As the sodium sulfur cell discharges, the sodium cations diffuse through the ceramic electrolyte separating the anode and the cathode, toward the sulfur cathode. When the sodium cations have passed entirely through the ceramic electrolyte, they meet the sulfur anions and combine to form sodium polysulfides. The formation of the sodium polysulfides is highly exothermic, so that the region of the sulfur cathode immediately adjacent to the surface of the ceramic electrolyte is heated above the general operating temperature of the cell.

Gas bubbles may form in the sulfur simultaneously and independently of the polysulfide reaction. The gas bubbles contain vaporized sulfur and/or other gases that were sealed into the cell when it was manufactured. In cells used on earth, the bubbles tend to float upwardly, because they are less dense than the surrounding liquid sulfur, and collect at the top end of the cell where they are harmless. In a weightless environment, there is no gravity to drive the bubbles upward.

Instead, the bubbles in the sulfur tend to migrate toward the hottest parts of the system and remain there, another manifestation of the Maringoni effect that has been previously observed in liquid spacecraft propellant tanks. As discussed above, the locally hottest part of the sulfur cathode is immediately adjacent to the ceramic electrolyte, and the bubbles tend to migrate to this region. Since there are no convection currents in a weightless environment, once the bubbles have reached this region, they will stay there.

The gradual accumulation of bubbles adjacent to the electrolyte impedes the reaction of the sodium cations and the sulfur anions to form sodium polysulfides, by preventing sulfur ions from reaching this region. The externally observed result is a gradual decrease in the capacity of the cell and an increase in its internal impedance.

The present invention provides means for avoiding the presence of bubbles within the sulfur. The adverse effects of bubbles may be avoided by various approaches, including prevention of their formation and avoiding the adverse effects, once the bubbles have formed. The preferred approach is to entirely avoid the formation of the bubbles, because removal of bubbles after formation is difficult in view of the electrically conductive inner structure of the cathode, to be discussed in more detail later. One method of practicing the preferred approach is to apply a gas pressure to the sulfur cathode of sufficiently high pressure to suppress formation of the bubbles in the sulfur. Such pressure should be at least as great as the vapor pressure of the sulfur at the operating temperature of the cell, as this pressure is sufficient to prevent the sulfur from vaporizing.

A positive pressure can be applied to the sulfur in several ways. One such approach is the application of pressure from an external pressurization source. The normal procedure of cell fabrication includes sealing the cell completely so that neither the sulfur nor the sodium can escape, and providing an external pressurization source could also provide an escape path for these components. It is therefore preferable to apply the pressure to the sulfur with the cell sealed.

The most preferred approach to applying the pressure to the sulfur cathode is to include within the chamber containing the sulfur a source of a gas that does not dissolve appreciably in the sulfur. The source is provided at a location remote from the surface of the ceramic electrolyte, so that the gas forms a pocket that expands to apply a pressure to the sulfur without being able to collect in the region near the electrolyte surface. The preferred source of such gas is the solid sodium azide, $NaN_3$, which decomposes to produce sodium and gaseous diatomic nitrogen molecules at the operating temperature of the cell.

Thus, further in accordance with the invention, a sodium sulfur electrical storage cell comprises a cell housing having a first chamber and a second chamber therein; a sodium anode within the first chamber of the housing; a sulfur cathode within the second chamber of the housing; a solid ceramic electrolyte separating the sodium anode and a sulfur cathode; and a quantity of pressurizing gas within the second chamber sufficient to pressurize the sulfur above its vapor pressure, the pressurizing gas being substantially insoluble in the sulfur. The pressurizing gas is most preferably provided by including in a location of the second chamber, remote from the electrolyte, a quantity of a compound such as sodium azide that vaporizes to produce a pressurizing gas and a metal or other element that does not adversely affect the operation of the cell. Since sodium is already present in the cell, it is preferred as the metallic decomposition product.

The present invention also extends to a process for storing and obtaining energy. As related to the discharge of the cell, a process for releasing previously stored electrical energy in a weightless environment comprises the steps of furnishing a sodium sulfur electrical storage cell, the cell including a sodium anode, a sulfur cathode, a solid ceramic electrolyte separating the sodium anode and the sulfur cathode, and means for avoiding bubbles in the sulfur; heating the electrical storage cell to a temperature of at least about 300° C. in a weightless environment; and permitting sodium cations to diffuse from the sodium anode to the sulfur cathode, through the solid ceramic electrolyte, while avoiding bubbles in the sulfur, thereby releasing previously stored electrical energy. The same approach previously described applies equally to this process.

It will be appreciated that the present invention provides an advance in the art of sodium sulfur cells, which advance is critical to the application of such cells in a weightless environment. By avoiding the accumulation of bubbles in the sulfur, the gradual deterioration in cell performance associated with accumulation of bubbles adjacent to the surface of the electrolyte is avoided. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a side sectional drawing of a sodium sulfur cell of the invention;

FIG. 2 is an enlarged pictorial representation of a detail of FIG. 1, illustrating a section through the region adjacent to the electrolyte;

FIG. 3 is a pictorial representation corresponding to FIG. 2, with the temperature distribution during cell discharge graphically superimposed; and FIG. 4 is a pictorial representation of a sodium sulfur cell and pressurization apparatus employing another embodiment of the invention.

DETAILED DESCRIPTION OF THE PREFERRED EMBODIMENT

A presently preferred form of a sodium sulfur cell 10 of the invention is illustrated in FIG. 1. The cell 10 includes an outer cylindrical housing 12 (also termed the first cylindrical shell) in which the other components of the cell are contained. To permit assembly, the housing 12 has a top portion 14 and a bottom portion 16, with a seal 18 between them. After assembly, the housing 12 is hermetically sealed. Within the housing 12 is a cylindrical protection tube 20 (also termed the second cylindrical shell) dimensioned to fit within, and disposed to be coaxial with, the housing 12.

An electrolyte 22 is a solid ceramic in the form of a third cylindrical shell that is coaxial with, and disposed between, the housing 12 and the protection tube 20. The electrolyte 22 is a ceramic material that permits the rapid diffusion of sodium ions therethrough. In its most preferred form, the ceramic electrolyte 22 is beta/beta double prime alumina of a composition of about 90% aluminum oxide, 9% sodium oxide, and 1 percent lithium oxide. (All compositions herein are in percent by weight, unless otherwise indicated.) The present invention is not limited to any particular composition of electrolyte, however.

Elemental sodium is contained within the protection tube 20. At one end of the protection tube 20 is an orifice 25 through which the interior of protection tube 20 communicates with the volume between the protection tube 20 and the electrolyte 22, termed the first chamber 24. When molten, the sodium flows from within the protection tube 20, through the orifice 25, and into the first chamber 24 by wicking or capillary action.

Elemental sulfur is contained within the volume between the housing 10 and the electrolyte 22, termed the second chamber 26. Additionally, this second chamber 26 is filled with a porous graphite felt 28 (illustrated in FIG. 2) made up of electrically conductive graphite fibers. The packing density of graphite fibers in the felt 28 is such that the sulfur, when molten, is free to flow through the felt 28. The felt 28 provides electrical conductivity through the second chamber 26.

The region of the cell 10 adjacent to the electrolyte 22 is illustrated in more detail in FIG. 2. During operation, the cell 10 is heated to a temperature at which the sulfur and the sodium are molten, preferably about 350° C. Molten sodium flows into the first chamber 24. Sodium cations diffuse through the electrolyte 22 from the first chamber 24 toward the second chamber 26. Upon reaching the second chamber 26, the sodium cations combine with sulfur anions at, and immediately adjacent to, an outer surface 30 of the electrolyte 22.

The sodium half-cell reactions for discharge are

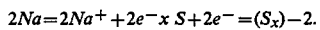

$$2Na = 2Na^+ + 2e^- \quad x\,S + 2e^- = (S_x) - 2.$$

The total reaction of the cell is therefore

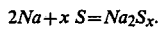

$$2Na + x\,S = Na_2S_x.$$

The electrons flow through an external circuit during the reaction. The reaction is presented in this manner because the sodium polysulfide $Na_2S_x$ may be present in several forms, depending upon the degree of discharge of the cell 10. With increasing degrees of discharge, the sequence of the sodium polysulfide produced is $Na_2S_5$, $Na_2S_4$, and $Na_2S_3$.

The above reaction producing sodium polysulfide is strongly exothermic, generating heat as it occurs. The region of the second chamber 26 immediately adjacent to the outer surface 30, as well as the outer surface 30 itself, are preferentially heated above the general operating temperature at which the cell 10 as a whole is maintained. The heat diffuses away from the point of production over time. However, if the discharge of the cell is rapid, the heat does not have time to diffuse away, and there is a heat buildup. The heat buildup is particularly acute when the cell 10 is operated in a weightless environment, because there are no natural gravity driven convection currents in the sulfur to accelerate heat transfer. FIG. 3 is a pictorial representation of the same region as FIG. 2, showing on the superimposed graph the temperature as a function of position along the cylindrical radius of the cell 10.

When the cell 10 is charged, the reverse reactions occur.

The sodium is the anode of the cell defined by this reaction, and is externally connected to an external circuit 32 through a negative electrode terminal 34 in the top portion 14 of the housing 12 of the cell 10. The sulfur is the cathode of the cell defined by this reaction, and is externally connected to the external circuit 32 through a positive electrode terminal 36 in the bottom portion 16 of the housing 12 of the cell 10. The graphite fibers in the felt 28 help to carry the electrical current from the point of the electrochemical reaction, near the outer surface 30 of the electrolyte, through the second chamber 26 to the housing 12 and thence to the positive electrode terminal 36. No such aid is required to conduct electrical current through the molten sodium, where current is carried by metallic conduction.

Again referring to FIG. 3, bubbles of gaseous sulfur 38 may be formed in the sulfur within the second chamber 26 during operation of the cell 10. If the cell 10 were operated in a terrestrial environment under the influence of gravity, the bubbles 38 would float upwardly because of their lower density than the sulfur, and would be harmlessly dissipated at the top of the second chamber 26. In a weightless environment, however, the bubbles 38 do not float, and instead would remain motionless in the sulfur unless driven to move by some other force.

Such a driving force for movement of the bubbles 38 is present in the form of the temperature gradient producing an increased temperature in the portion of the second chamber 26 adjacent to the outer surface 30 of the electrolyte 22. In a weightless environment, it has been observed in other contexts that bubbles of gas in a fluid tend to migrate toward the highest temperature portion of the fluid, a phenomenon known as the Maringoni effect. The same principle drives the bubbles 38 toward the outer surface 30. Over time and as depicted in FIG. 3, the bubbles 38 accumulate adjacent to the outer surface 30 of the electrolyte 22, forming a boundary layer of bubbles that impede the movement of sulfur toward, and reaction products away from, the outer surface 30. The cell reaction is therefore impeded, and the apparent cell electrical impedance increases over time.

In its preferred form, the present invention prevents the formation of bubbles in the sulfur entirely, so that there are no bubbles present in the sulfur to migrate toward the surface 30. Bubble formation is suppressed by applying a positive pressure to the surface of the sulfur cathode. The positive pressure must be sufficiently high to prevent vaporization of the sulfur. At the preferred operating temperature of 350° C., the vapor pressure of sulfur is about ½ atmosphere. At least about ½ atmosphere of positive pressure must therefore be applied to the surface of the sulfur to prevent vaporization.

The positive pressure may be applied in several ways. The favored approach is to apply a gas pressure to a surface of the sulfur cathode within the second chamber 26. The selected gas should be substantially insoluble in the sulfur, as otherwise it would only further contribute to the potential problem by itself entering the sulfur and possibly forming bubbles. As used herein, "substantially insoluble" means that the gas preferably has no solubility in the sulfur, but it is recognized that virtually all gases will have at least some very small solubility in molten sulfur. Such very small solubility is acceptable in operation of the invention.

The most preferred procedure for providing a positive gas pressure is to include within the chamber a sufficient amount of a compound 40 that decomposes at the operating temperature of the cell 10 to produce a gas that is substantially insoluble in the sulfur. The decomposition of the compound should not produce any other products that would interfere with the operation of the cell, as by contamination of the sulfur. The compound 40 must be provided at a point remote from the portion of the second chamber 26 adjacent to the outer surface 30, so that the product pressurizing gas cannot find its way to the region adjacent to the outer surface 30, as again this would contribute to the potential problem.

The most preferred compound for providing the pressurizing gas is sodium azide, $NaN_3$. Sodium azide decomposes at the cell operating temperature to produce sodium and diatomic nitrogen gas, which is substantially insoluble in liquid sulfur. The sodium is not a contaminant, as sodium naturally enters the sulfur during the discharge reaction described above. The solid sodium azide is initially positioned at one end of the second chamber 26 remote from the electrolyte 22 and separated from the sulfur by a carbon separator 41, see FIG. 1. When the cell 10 is heated to its operating temperature, the sodium azide decomposes, producing a nitrogen pressurizing gas that prevents formation of bubbles in the sulfur. The pressure of the gas is determined by the amount of sodium azide initially furnished and vaporized.

Some further details of the construction of the most preferred form of the cell 10 are provided for illustrative purposes, but are not to be taken as limiting of the invention, as the invention may equally well be applied to other forms of the cell. The overall length of the cell 10 is about 10 inches, and the outer diameter of the housing 12 is about 1⅜ inches. The housing 12 is formed of chromium coated stainless steel or molybdenum, which is resistant to corrosion by the sulfur, about 0.020 inches thick. The protection tube 20 is formed of stainless steel, about 0.015 inches thick. The electrolyte is the previously described ceramic material about 0.045 inches thick. The first chamber 24, the space between the outer diameter of the protection tube 20 and the inner diameter of the electrolyte 22, is about 0.020 inches wide. The second chamber 26, the space between the outer diameter of the electrolyte 22 and the inner diameter of the housing 12, is about 0.170 inches wide. To attain a pressurizing pressure of about 2 atmospheres at the cell operating temperature of 350° C., about 2-5 grams of sodium azide is furnished.

The cell 10 of the invention produces an open circuit voltage of about 2.08 volts over most of its capacity range. The cell having the preferred dimensions and characteristics just described has a capacity of about 40 ampere-hours. In normal spacecraft construction, a number of the individual cells are connected together in an appropriate fashion to provide power of the required voltage and capacity.

Another approach to pressurizing the sulfur to prevent the formation of bubbles is illustrated in FIG. 4. A pressurizing gas such as nitrogen is applied from an external source 50 to the surface of the sulfur remote from the outer surface 30 of the electrolyte, through a gas delivery tube 52. This approach has the advantages that the pressure could be maintained constant regardless of the level of liquid in the second chamber 26, and that the gas pressure in all of the cells that form a battery could be controlled during operation by a single valve 54. It has the disadvantage that the individual cells would no longer be sealed, so that a single leak anywhere in the system could cause failure of the entire battery. For this reason, the approach of using a compound 40 inside a sealed cell is preferred. Failure of one cell will not propagate to cause failure of the entire battery.

By applying a sufficiently great pressure to the sulfur by any acceptable method, formation of bubbles in the sulfur is suppressed. As a result, there are no bubbles present in the sulfur that might migrate in the manner illustrated in FIG. 3 to interfere with operation of the cell in a weightless environment. Removal of previously formed bubbles is an alternative approach, but is not preferred because of the difficulty of removing bubbles from the felt-filled second chamber 26. Instead, it is preferred to prevent formation of any bubbles.

The cell 10 of the invention is operable in a weightless environment without degradation of performance by formation of bubbles formed in the sulfur. Formation of bubbles in the sodium is not a problem, because of its much higher boiling point. Although a particular embodiment of the invention has been described in detail for purposes of illustration, various modifications may be made without departing from the spirit and scope of the invention. Accordingly, the invention is not to be limited except as by the appended claims.

What is claimed is:

1. A sodium sulfur electrical storage cell, comprising:
   a sodium anode;
   a sulfur cathode;
   a solid ceramic electrolyte separating the sodium anode and the sulfur cathode; and
   means for avoiding bubbles in the sulfur, the means for avoiding being in contact with the sulfur.

2. The sodium sulfur electrical storage cell of claim 1, wherein the means for avoiding includes:
   means for pressurizing the sulfur cathode to prevent the formation of bubbles in the sulfur.

3. The sodium sulfur electrical storage cell of claim 2, wherein the means for pressurizing includes a chemical compound that decomposes to produce a gas that is substantially insoluble in the sulfur.

4. The sodium sulfur electrical storage cell of claim 2, wherein the means for pressurizing includes a quantity of sodium azide.

5. The sodium sulfur electrical storage cell of claim 1, further including a housing in which the anode, the cathode, the electrolyte, and the means for avoiding are enclosed, and wherein the housing includes a first chamber in which the anode is contained, and a second chamber in which the cathode is contained.

6. The sodium sulfur electrical storage cell of claim 5, wherein the electrolyte forms at least a portion of the wall of the second chamber.

7. The sodium sulfur electrical storage cell of claim 5, wherein the means for avoiding includes means for applying a pressure to the second chamber greater than the vapor pressure of the sulfur at the operating temperature of the cell.

8. The sodium sulfur electrical storage cell of claim 1, wherein the electrolyte is a solid ceramic consisting essentially of a mixture of aluminum oxide, sodium oxide, and lithium oxide.

9. A sodium sulfur electrical storage cell, comprising:
a cell housing having a first chamber and a second chamber therein;
a sodium anode within the first chamber of the housing;
a sulfur cathode within the second chamber of the housing;
a solid ceramic electrolyte separating the sodium anode and a sulfur cathode; and
a quantity of pressurizing gas within the second chamber sufficient to pressurize the sulfur above its vapor pressure, the pressurizing gas being substantially insoluble in the sulfur.

10. The sodium sulfur electrical storage cell of claim 9, wherein the solid ceramic electrolyte forms at least part of the walls of the second chamber.

11. The sodium sulfur electrical storage cell of claim 9, wherein
a first cylindrical shell comprises at least a portion of the wall of the cell housing;
a second cylindrical shell, dimensioned to fit within the first cylindrical shell, comprises at least one wall of the first chamber, which contains the sodium anode;
the solid ceramic electrolyte is in the form of a third cylindrical shell disposed between the second cylindrical shell and the first cylindrical shell, the sulfur cathode is disposed between the first cylindrical shell and the third cylindrical shell, and the quantity of pressurizing gas is contained in the volume between the first cylindrical shell and the third cylindrical shell; and
means for sodium communication permits sodium to flow from the interior of the second cylindrical shell to the volume between the second cylindrical shell and the solid ceramic.

12. A process for releasing previously stored electrical energy in a weightless environment, comprising the steps of:
furnishing a sodium sulfur electrical storage cell, the cell including
a sodium anode,
a sulfur cathode,
a solid ceramic electrolyte separating the sodium anode and the sulfur cathode, and
means for avoiding bubbles in the sulfur, the means for avoiding being in contact with the sulfur;
heating the electrical storage cell to a temperature of at least about 300° C. in a weightless environment; and
permitting sodium cations to diffuse from the sodium anode to the sulfur cathode, through the solid ceramic electrolyte, while avoiding bubbles in the sulfur, thereby releasing previously stored electrical energy.

13. The process of claim 12, wherein the means for avoiding includes:
means for pressurizing the sulfur cathode to prevent the formation of bubbles in the sulfur.

14. The process of claim 13, wherein the means for pressurizing includes a chemical compound that decomposes to produce a gas that is substantially insoluble in the sulfur.

15. The process of claim 13, wherein the means for pressurizing includes a quantity of sodium azide.

* * * * *